(12) United States Patent
Qu et al.

(10) Patent No.: US 10,809,415 B2
(45) Date of Patent: Oct. 20, 2020

(54) IMAGING DEVICE FOR USE IN VEHICLE SECURITY CHECK AND METHOD THEREFOR

(71) Applicant: Beijing Hualixing Technology Development Co., Ltd., Beijing (CN)

(72) Inventors: Haibo Qu, Beijing (CN); Jie Zhao, Beijing (CN)

(73) Assignee: Beijing Haulixing Technology Development Co., Ltd. (CN)

( * ) Notice: Subject to any disclaimer, the term of this patent is extended or adjusted under 35 U.S.C. 154(b) by 0 days.

(21) Appl. No.: 16/327,681

(22) PCT Filed: Jun. 27, 2017

(86) PCT No.: PCT/CN2017/090351
§ 371 (c)(1),
(2) Date: Feb. 22, 2019

(87) PCT Pub. No.: WO2018/036265
PCT Pub. Date: Mar. 1, 2018

(65) Prior Publication Data
US 2019/0196052 A1 Jun. 27, 2019

(30) Foreign Application Priority Data

Aug. 25, 2016 (CN) .......................... 2016 1 0728728
Aug. 25, 2016 (CN) ..................... 2016 2 0947258 U

(51) Int. Cl.
*G01N 23/04* (2018.01)
*G01V 5/00* (2006.01)
*G01N 23/10* (2018.01)

(52) U.S. Cl.
CPC ........... *G01V 5/0066* (2013.01); *G01N 23/10* (2013.01); *G01V 5/0016* (2013.01); *G01V 5/0041* (2013.01); *G01N 2223/3307* (2013.01)

(58) Field of Classification Search
CPC .. G01V 5/0066; G01V 5/0016; G01V 5/0041; G01N 23/00; G01N 2223/3307; G01N 23/10
See application file for complete search history.

(56) References Cited

U.S. PATENT DOCUMENTS 6,459,764 B1 * 10/2002 Chalmers ............... G01N 23/04
378/86
8,908,831 B2 * 12/2014 Bendahan ............ G01N 23/203
378/86
(Continued)

FOREIGN PATENT DOCUMENTS

CN 105438755 3/2016
CN 105445294 3/2016
(Continued)

OTHER PUBLICATIONS

International Search Report for Application No. PCT/CN2017/090351 dated Sep. 22, 2017.
(Continued)

*Primary Examiner* — Kiho Kim
(74) *Attorney, Agent, or Firm* — Tumey L.L.P.

(57) ABSTRACT

The present disclosure relates to an imaging device for use in vehicle security check and a method therefor, and belongs to the field of security check. The imaging device for use in vehicle security check includes: a radiation source device including a first ray unit configured to emit a first ray beam by a first predetermined spread angle to allow the first ray beam to penetrate a first part of a vehicle to be inspected passing through an inspection lane at a preset speed; and a detector device including a first detector unit arranged corresponding to the first ray unit, and configured to receive the first ray beam. The radiation source device is at least partially arranged on the road surface of the inspection lane,
(Continued)

and the first detector unit is arranged at a first side of the inspection lane.

18 Claims, 6 Drawing Sheets

(56) References Cited

U.S. PATENT DOCUMENTS

| | | | |
|---|---|---|---|
| 9,057,679 B2 * | 6/2015 | Morton | G01V 5/0066 |
| 9,274,065 B2 * | 3/2016 | Morton | G01V 5/0041 |
| 10,317,566 B2 * | 6/2019 | Morton | G01V 5/0016 |
| 10,324,223 B2 * | 6/2019 | Al-Hoshani | G01V 5/0016 |
| 2004/0017887 A1 * | 1/2004 | Le | G01N 23/04 378/57 |
| 2004/0125914 A1 * | 7/2004 | Kang | G01N 23/04 378/57 |
| 2005/0157842 A1 * | 7/2005 | Agrawal | G01N 23/04 378/27 |
| 2006/0045660 A1 * | 3/2006 | Di Rosa | B65G 63/004 414/139.9 |
| 2007/0269007 A1 | 11/2007 | Akery | |
| 2009/0116614 A1 * | 5/2009 | Kotowski | G01N 23/04 378/57 |
| 2010/0295689 A1 * | 11/2010 | Armistead, Jr. | G01V 5/0025 340/600 |
| 2011/0038453 A1 * | 2/2011 | Morton | G01V 5/0016 378/57 |
| 2011/0274242 A1 * | 11/2011 | Linev | G01V 5/0033 378/57 |
| 2013/0039462 A1 * | 2/2013 | Morton | G01V 5/0041 378/57 |
| 2013/0039472 A1 * | 2/2013 | Morton | G01V 5/0041 378/88 |
| 2013/0208857 A1 * | 8/2013 | Arodzero | G01T 1/2018 378/57 |
| 2014/0226789 A1 * | 8/2014 | Bendahan | G01N 23/203 378/86 |
| 2015/0168589 A1 | 6/2015 | Morton et al. | |
| 2015/0325401 A1 * | 11/2015 | Langeveld | H01J 37/14 378/57 |
| 2015/0369955 A1 * | 12/2015 | Al-Hoshani | G01V 5/0016 378/57 |
| 2016/0189360 A1 * | 6/2016 | Kang | G06T 7/0004 378/57 |
| 2017/0023698 A1 * | 1/2017 | Morton | G01V 5/0041 |
| 2017/0090062 A1 * | 3/2017 | Cao | G01V 5/0041 |
| 2017/0094762 A1 * | 3/2017 | Hu | G21K 1/10 |

FOREIGN PATENT DOCUMENTS

| | | | | |
|---|---|---|---|---|
| CN | 105809655 | | 7/2016 | |
| CN | 106290422 | | 1/2017 | |
| CN | 206132670 | | 4/2017 | |
| EP | 1635169 | | 3/2006 | |
| WO | 2009106815 | | 9/2009 | |
| WO | WO-2015172464 A1 * | 11/2015 | | G01V 5/0016 |

OTHER PUBLICATIONS

Extended European Search Report and Written Opinion for EP Application No. 17842689 dated Mar. 11, 2020.

* cited by examiner

IMAGING DEVICE FOR USE IN VEHICLE SECURITY CHECK AND METHOD THEREFOR

This application is the 371 application of PCT Application No. PCT/CN2017/090351, filed on Jun. 27, 2017, which is based upon and claims priority to Chinese Invention Patent Application No. CN201610728728.5, filed on Aug. 25, 2016, "IMAGING DEVICE FOR USE IN VEHICLE SECURITY CHECK AND METHOD THEREFOR", and Chinese Utility Model Patent Application No. CN201620947258.7, filed on Aug. 25, 2016, "IMAGING DEVICE FOR USE IN VEHICLE SECURITY CHECK AND METHOD THEREFOR", the entire content of all of which is incorporated herein by reference.

TECHNICAL FIELD

The present disclosure relates to the field of security check technology, and particularly to an imaging device for use in vehicle security check and a method therefor.

BACKGROUND

With the need to combat smuggling and security, the world is studying how to use more advanced technology to protect social security and combat smuggling and terrorist crimes.

Using cargo or passenger vehicles as tools to hide prohibited items such as smuggled goods, weapons or explosives in hidden places such as interiors or tires of vehicles, so as to avoid inspections and enter into areas such as government departments, important venues or customs to carry out criminal activities, which has strong concealment characteristics. The traditional manual inspection method is not only inefficient and slow, but also needs a lot of manpower and material resources, and has a poor accuracy. Therefore, there is an urgent need for a system that can quickly capture images of hidden parts of vehicles during vehicle traffic, thereby discovering prohibited items, and can be widely used in places such as customs, government agencies, security departments, prisons, venues, competition, venues, airports, restaurants, banks, ports or nuclear power plants, for security inspection.

At present, the general inspection technology scheme for container vehicles is to place the radiation source on the side of the vehicle to be inspected, and to image. Because the radiation source needs a certain installation height, the minimum scanning height of the device is not less than 0.5 m, and it is impossible to scan the complete vehicle tires and the lower toolbox or boot of the vehicle. Therefore, it can be solved only by raising the ground height of the vehicle, which not only needs a large amount of civil construction, but also is impossible to carry out ground construction in many application scenarios of container vehicle inspection device. For this reason, the current general inspection technology scheme has loopholes in the inspection of vehicle tires, lower toolboxes and luggage boxes, which brings potential safety hazard.

At the same time, in order to ensure the safety of personnel, the current inspection technology of radiation imaging in vehicle traffic is necessary to avoid the cab before scanning. There will be personnel in the back row of the cab of small passenger vehicles as well, such that the traditional inspection technology cannot implement the inspection of the hidden portions such as the backup box, tires and toolboxes of small or medium-sized passenger vehicles, and the traditional inspection technical scheme has potential safety hazards and risks for the inspection of small passenger vehicles.

Therefore, there is a need for a new imaging device for use in vehicle safety check and a method therefor.

The above information disclosed in this Background section is only for enhancement of understanding of the background of the present disclosure, and thus it may include information that does not constitute the prior art known to those ordinary skilled in the art.

SUMMARY

The present disclosure provides an imaging device for use in vehicle security check and method therefor, which can solve at least a part of the problems in the above prior art.

Other feature and advantages of the present disclosure will be apparent from the following detailed description, or will be learned in part through the practice of the present disclosure.

According to one aspect of the present disclosure, an imaging device for use in vehicle security check is provided, which includes: a radiation source device, including a first ray unit configured to emit a first ray beam by a first predetermined spread angle, to allow the first ray beam to penetrate a first part of a vehicle to be inspected passing through an inspection lane at a preset speed; and a detector device, including a first detector unit arranged corresponding to the first ray unit, wherein the first detector unit is configured to receive the first ray beam, wherein the radiation source device is at least partially arranged on a road surface of the inspection lane, and the first detector unit is arranged at a first side of the inspection lane.

In an exemplary embodiment of the present disclosure, the radiation source device further includes: a second ray unit configured to emitting a second ray beam by a second predetermined spread angle, to allow the second ray beam to penetrate a second part of the vehicle to be inspected, and wherein a direction of the second predetermined spread angle is different from a direction of the first predetermined spread angle.

In an exemplary embodiment of the present disclosure, the detector device further includes: a second detector unit arranged corresponding to the second ray unit, wherein the second detector unit is configured to receive the second ray beam, and wherein the second detector unit is arranged at a second side of the inspection lane.

In an exemplary embodiment of the present disclosure, the first detector unit and the second detector device are provided with a predetermined height, and wherein the predetermined height is determined according to the first predetermined spread angle of the first ray beam and the second predetermined spread angle of the second ray beam and sizes of the first part and the second part.

In an exemplary embodiment of the present disclosure, the first ray unit includes: a ray source; a shield and a collimator, wherein the shield and the collimator are configured to shield rays outside the first predetermined spread angle emitted by the ray source, and constrain a width of the rays at the same time.

In an exemplary embodiment of the present disclosure, the first ray unit includes: a ray source, a shield and a collimator. The shield and the collimator are configured to shield rays emitted by the ray source outside the first ray beam emitted along the first predetermined spread angle and the second ray beam emitted along the second predetermined spread angle, and constrain the width of the rays. The second ray beam penetrates through the second part of the vehicle to be inspected.

In an exemplary embodiment of the present disclosure, the detector device further includes: a second detector unit, arranged corresponding to the second predetermined spread angle, and configured to receive the second ray beam, wherein the second detector unit is arranged at a second side of the inspection lane.

In an exemplary embodiment of the present disclosure, a part of the radiation source device is embedded blow the road surface of the inspection lane, and the other part is exposed out of the road surface of the inspection lane, wherein a height of the exposed part is less than a preset value, and wherein the preset value is related to a height from ground of a chassis of the vehicle to be inspected.

In an exemplary embodiment of the present disclosure, when the vehicle to be inspected is of a first vehicle type, the exposed part of the radiation source device is provided with a first height, and the radiation source device emits the rays with a first energy, when the vehicle to be inspected is of a second vehicle type, the exposed part of the radiation source device is provided with a second height, and the radiation source device emits the rays with a second energy, and wherein the first height is less than the second height, and the first energy is less than the second energy.

In an exemplary embodiment of the present disclosure, the imaging device further includes: a first sensing component, provided on the first side of the radiation source device, and configured to output a first sensing signal indicating that the vehicle to be inspected enters the inspection lane.

In an exemplary embodiment of the present disclosure, the first sensing component includes a ground sensing coil embedded at the entrance of the inspection lane.

In an exemplary embodiment of the present disclosure, the imaging device further includes: a second sensing component, provided between the first sensing component and the radiation source device, and configured to output a second sensing signal indicating that the first part of the vehicle to be inspected enters a radiation area of the radiation source device, so as to control the radiation source device to emit the rays with a first dose.

In an exemplary embodiment of the present disclosure, the second sensing component includes: a first photoelectric switch group provided on both sides of the inspection lane and/or the road surface of the inspection lane.

In an exemplary embodiment of the present disclosure, the imaging device further includes: a third sensing component, provided on the second side of the radiation source device, and configured to output a third sensing signal indicating that the first part of the vehicle to be inspected has driven away from the radiation area of the radiation source device, so as to control the radiation source device to emit the rays with a second dose, wherein the second dose is less than the first dose.

In an exemplary embodiment of the present disclosure, the third sensing component includes: a second photoelectric switch group provided on both sides of the inspection lane and/or the road surface of the inspection lane.

In an exemplary embodiment of the present disclosure, the imaging device further includes: a speed sensor, configured to measure a moving speed of the vehicle to be inspected in the inspection lane.

In an exemplary embodiment of the present disclosure, the imaging device further includes: a first delay device, connected to the speed sensor, and configured to set a first delay time according to the moving speed and a size of the first part, wherein, when the second sensing component detects that the first part of the vehicle to be inspected enters the radiation area of the radiation source device, after the first delay time, a first control signal is output to control a dose of the rays emitted by the radiation source device to be converted from the first dose to the second dose.

In an exemplary embodiment of the present disclosure, the imaging device further includes: a second delay device, connected with the speed sensor, and configured to set a second delay time according to the moving speed and a wheelbase between the first part and a third part of the vehicle to be inspected, wherein, when the dose of the rays emitted by the radiation source device is converted from the first dose to the second dose, after the second delay time, a second control signal is output to control the dose of the rays emitted by the radiation source device to be converted from the second dose to the first dose.

In an exemplary embodiment of the present disclosure, the radiation source device is provided at a center of the road surface of the inspection lane, and a target center of the first ray unit is provided above the road surface of the inspection lane.

In an exemplary embodiment of the present disclosure, a direction of the first predetermined spread angle is opposite to a direction of the second predetermined spread angle, and the first detector unit and the second detector unit are oppositely arranged.

In an exemplary embodiment of the present disclosure, the imaging device further includes: a data acquisition and imaging device, connected with the detector device, and configured to receive a first ray intensity data output by the first ray unit to generate a first radiation image of the first part.

In an exemplary embodiment of the present disclosure, the imaging device further includes: a display device, connected with the data acquisition and imaging device, and configured to display the first radiation image of the vehicle to be inspected.

In an exemplary embodiment of the present disclosure, the imaging device further includes: a judging device, configured to determine whether a prohibited item is entrained in the first part according to the first radiation image.

In an exemplary embodiment of the present disclosure, the imaging device further includes: a control device, connected with the radiation source device and the detector device, and configured to control activation and deactivation of the radiation source device and the detector device.

In an exemplary embodiment of the present disclosure, the first detector unit and the second detector unit are line array detectors.

In an exemplary embodiment of the present disclosure, a radiation surface of the first ray beam of the first predetermined spread angle is perpendicular to the road surface of the inspection lane.

According to another aspect of the present disclosure, an imaging method for use in vehicle security check it provided, which includes: emitting a first ray beam by a first predetermined spread angle, to penetrate a first part of a vehicle to be inspected passing through an inspection lane at a preset speed; receiving the first ray beam and outputting a first ray intensity data; generating a first radiation image of the first part according to the first ray intensity data; and determining whether a violating item is entrained in the first part according to the first radiation image.

In an exemplary embodiment of the present disclosure, the imaging method further includes: emitting a second ray beam by a second predetermined spread angle, to penetrate a second part of the vehicle to be inspected; receiving the second ray beam and outputting a second ray intensity data; generating a second radiation image of the second part according to the second ray intensity data; and determining whether a prohibited item is entrained in the second part according to the second radiation image, wherein the direction of the second predetermined spread angle is different from the first predetermined spread angle.

In an exemplary embodiment of the present disclosure, the imaging device further includes: when it is detected that the first part of the vehicle to be inspected passes a radiation area in the inspection lane, after a predetermined delay time, scanning a third part of the vehicle to be inspected by the first ray beam and checking whether a prohibited item is entrained in the third part.

According to the imaging device for use in vehicle security check of the present disclosure and the method thereof, it is possible to quickly carry out a radiation imaging on a specific part of the vehicle (such as a tire, a trunk, a boot, a toolbox, etc.), so as to realize the purpose of detecting whether a prohibited item is entrained in the specific part.

Additionally, according to some embodiments of the present disclosure, only a specific part of the vehicle may be imaged, and no imaging is performed on other parts, such that the dose of radiation received by the occupant is minimized.

In still another aspect, according to some embodiments of the present disclosure, the left and the right specific parts of the vehicle may be simultaneously imaged, and the imaged regions of the left and the right parts are not overlapped.

BRIEF DESCRIPTION OF THE DRAWINGS

The above and other features and advantages of the present disclosure will become more apparent by reference to the accompanying drawings to descript the exemplary embodiments thereof in detail.

DETAILED DESCRIPTION

Figure 1:
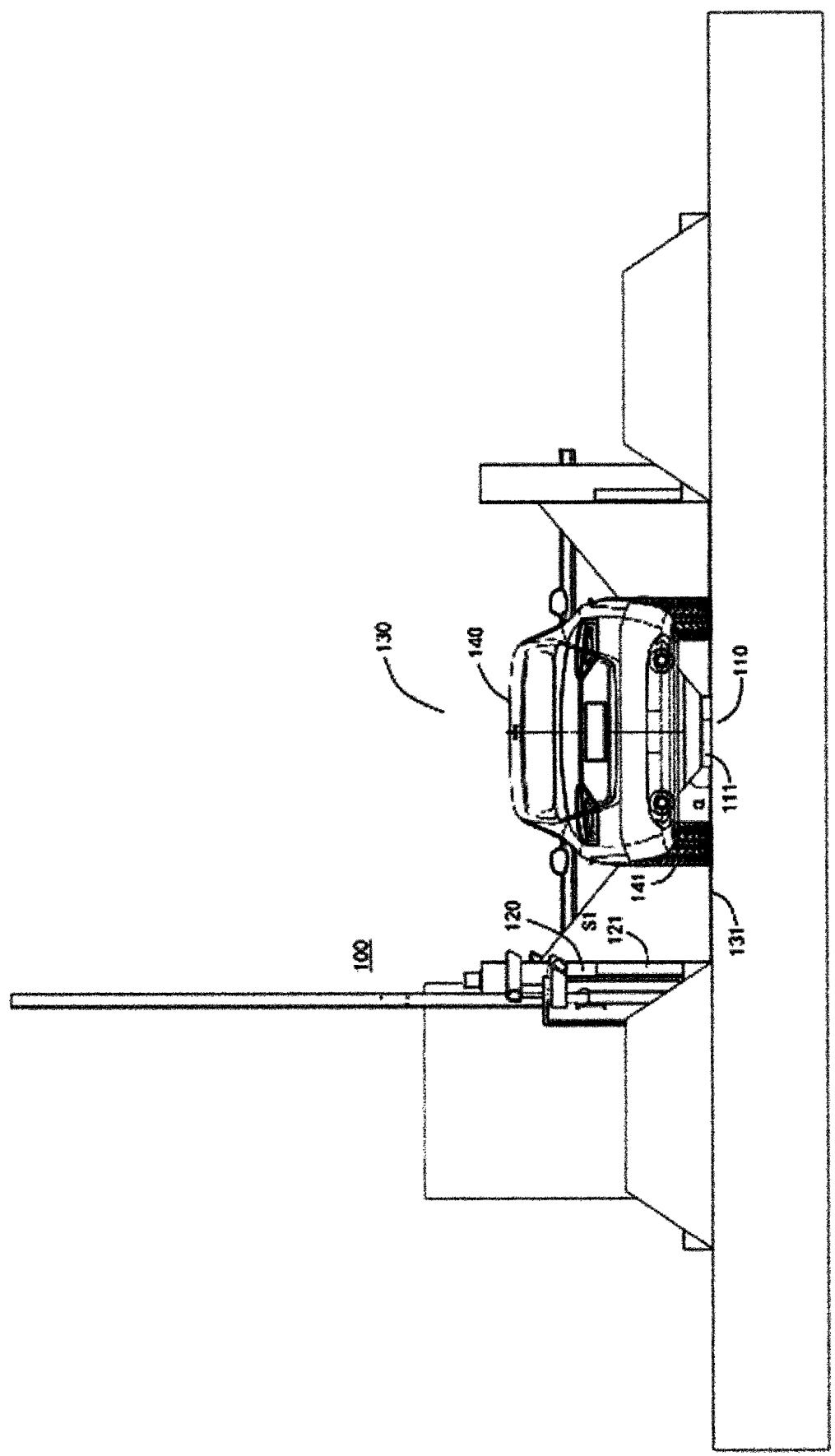
FIG. 1 is a schematic structure diagram illustrating of an imaging device for use in vehicle security check according to an exemplary embodiment of the present disclosure.

Example embodiments will now be described more fully with reference to the accompanying drawings. However, the exemplary embodiments can be embodied in a variety of forms and should not be construed as being limited to the embodiments set forth herein. Oppositely, the embodiments are provided, so that this present disclosure will be thorough and complete, and the concepts of the example embodiments are fully conveyed to those skilled in the art. The same reference numerals in the drawings denote the same or similar parts, and the repeated description thereof will be omitted.

Furthermore, the described features, structures or characteristics may be combined in any suitable manner in one or more embodiments. In the following description, numerous specific details are set forth, so that a full understanding of the embodiments of the present disclosure can be available. However, those skilled in the art will appreciate that the technical solution of the present disclosure may be practiced without one or more of the specific details, or other methods, components, materials, devices, steps, etc. may be adopted. In other instances, well-known structures, methods, devices, implementations, materials, or operations are not shown or described in detail to avoid obscuring various aspects of the present disclosure.

The embodiment of the present disclosure provides, at first, a an imaging device for use in vehicle security check, which utilizes the radiation source device mounted on the road surface of the inspection lane and the detector device arranged at a side surface of the inspection lane to carry out radiation imaging for a specific part of the vehicle in motion, and determines according to the radiation imaging whether a prohibited item is entrained in the specific part. The following embodiments are illustrated by taking the specific part being a tire of the vehicle to be inspected as an example. It should be noted that, the specific part is not limited to the tire, for example it may further be the boot, the toolbox, the trunk, etc.

FIG. 1 is a schematic structure diagram illustrating of an imaging device for use in vehicle security check according to an exemplary embodiment of the present disclosure.

As shown in FIG. 1, an imaging device 100 for use in vehicle security check may include: a radiation source device 110 and a detector device 120.

The radiation source device 110 may include a first ray unit 111, the first ray unit 111 is configured to emit a first ray beam S1 by a first predetermined spread angle α, so as to allow the first ray beam S1 to penetrate the first part of a vehicle to be inspected 140 (for example, the first tire 141) passing through the inspection lane 130 at a preset speed.

The radiation source device 110 is at least partially arranged on the road surface 131 of the inspection lane 130.

In an exemplary embodiment, a part of the radiation source device 110 may be embedded below the road surface of the inspection lane 130, and another part of the radiation source device 110 is exposed out of the road surface 131 of the inspection lane 130, wherein the height H1 of the exposed part is less than a preset value.

In an exemplary embodiment, the preset value is related to the height from ground H2 of the chassis of the inspected 140, wherein, H1 is less than H2.

In other embodiments, the radiation source device 110 may further be completely arranged on the road surface 131 of the inspection lane 130, as long as it satisfies that the height of the part exposed out of the ground being less than the minimum height from ground of the vehicle to be inspected.

In an exemplary embodiment, the radiation source device 110 may be provided at the center of the road surface 131 of the inspection lane 130. In some embodiments, the target center of the first ray unit 111 is provided above the road surface 131 of the inspection lane 130.

In some embodiments, the radiation source device 110 is a separate module with self-shielding capability. The area except for the outlet for exiting the first ray beam S1 has a leakage rate less than 2.5 $\mu Gyh^{-1}$ at a distance of 1.5 m from the radiation source device. In some embodiments, the radiation source device 110 may be of a metal plate structure with an IP65 protection rating.

In an exemplary embodiment, when the vehicle to be inspected 140 is of a first vehicle type, the exposed part of the radiation source device 110 is provided with a first height, and the radiation source device 110 emits the rays with a first energy.

For example, the first vehicle type may be a universal passenger car. Since the height from ground of the chassis of the universal passenger car is generally a minimum of 150 mm, and may reach 100 mm under heavy load condition, the first height may be set to be less than 100 mm, such as 90 mm, 80 mm, etc.

In an exemplary embodiment, when the vehicle to be inspected 140 is of a second vehicle type, the exposed part of the radiation source device 110 is provided with a second height, and the radiation source device 110 emits the rays with a second energy.

In some embodiments, the first height is less than the second height, and the first energy is less than the second energy.

For example, the second vehicle type may be a container car. The height from ground of the chassis of the container car is generally a minimum of 300 mm, so the second height may be set to be less than 300 mm, such as 200 mm, 150 mm, etc. At the same time, since the tire thickness of the universal passenger car is generally lower than that of the container car, the ray energy for the radiation imaging for the tire of the universal passenger car may be set lower than the ray energy for the radiation imaging for the tire of the container car, but the present disclosure is not limited thereto.

In some embodiments, it is further possible to carry out a more detailed division of the vehicle type of the vehicle to be inspected, for example, into a small car, a bus, a container trunk, a van, etc. The radiation source devices with different energies and different heights from ground may be set according to different vehicle types.

In some embodiments, radiation source devices suitable for corresponding specifications of different vehicle types may be made. According to the different vehicle type of the vehicle to be inspected, the replacement of radiation source device may meet the requirement of tire inspection for different vehicle types.

In some embodiments, a self-adaptive radiation source device may be made, and the height from ground of the chassis of the vehicle to be inspected may be measured by a vehicle chassis height sensor. Then, the height of the part exposed out of the road surface of the radiation source device and/or the ray energy emitted by the radiation source device are adjusted adaptively according to the detected height from ground of the vehicle to be inspected.

The detector device 120 may include a first detector unit 121 arranged corresponding to the first ray unit 111, and the first detector unit 121 is configured to receive the first ray beam S1.

In some embodiments, the imaging area of the first detector unit 121 may be set to 1.2 m. The present disclosure is not limited thereto. The height of the specific imaging area may be adjusted according to the system requirements, for example, according to the size of the tire of the vehicle to be inspected, the position of the trunk, the boot and the toolbox, the size of the angle of the rays emitted by the radiation source device, the distance between the radiation source device and the detector device, and the distance between the tire and the radiation source device, etc. For example, in order to be able to fully image the tire of the vehicle to be inspected, the height of the imaging area of the first detector unit may be set to meet the requirement for full imaging of the maximum size of the tire of the vehicle to be inspected.

In other embodiments, the first detector unit 121 has a start-inspection height of 0 m-0.65 m. The start-inspection height here refers to the height from ground of the imaging area of the first detector unit 121.

For example, the target center of the first ray unit 111 is at the same height as the road surface 131 of the inspection lane, the maximum of the height of the radiation source device 110 exposed out of the road surface is not more than 80 mm, and the first detector unit 121 is mounted in close proximity to the road surface 131 of the inspection lane 130, thus, the tire of the vehicle to be inspected may be inspected from "0" height above the road surface. By scanning the tires of the vehicle to be inspected, it is checked whether the tire carries out smuggling or carried with a prohibited item.

In the above embodiment, the tire of the vehicle to be inspected is taken as an example to explain that the start-inspection height of the first detector unit 121 is zero. However, the start-inspection height may be adjusted according to the specific part to be inspected. For example, since the height from ground of the specific part such as the boot, the toolbox, etc. is not zero, the corresponding start-inspection height may be set according to the height from ground of the boot, the toolbox, etc.

In some embodiments, the detector device 120 may adopt a metal plate structure, which may meet the requirement of long-time outdoor use, ventilation, heat preservation, rain-proof, etc.

In an exemplary embodiment, the first detector unit 121 is arranged at a first side of the inspection lane 130. For example, as shown in FIG. 1, the first detector unit 121 is arranged on the right side of the inspection lane 130 with respect to the driver of the vehicle to be inspected. However, the present disclosure is not limited thereto. The first detector unit 121 may be arranged on the left side as well, as long as it can receive the rays passing through the tire on the side of the vehicle to be inspected.

In an exemplary embodiment, the first ray unit 111 includes a ray source, a shield, and a collimator. The shield and the collimator are configured to shield rays emitted by the ray source outside the first predetermined spread angle $\alpha$, and at the same time constrain the width of the rays of the first predetermined spread angle $\alpha$. In some embodiments, the width of the constrained rays may be from 3 mm to 5 mm. In other embodiments, the width of the constrained rays may be from 5 mm to 18 mm. According to the requirement of the system, a corresponding collimator may be selected to obtain the rays of the corresponding width.

For example, the first ray unit 111 may adopt a ray source that emits rays in directions to the circumference. The shield is capable of shielding all rays emitted by the radiation source except the first ray beam S1 along the first predetermined spread angle $\alpha$, thereby reducing the amount of radiation of the radiation source to the occupant. In some embodiments, the radiation source may adopt an isotope radiation source.

In an exemplary embodiment, the first ray unit 111 may use a first X-ray machine. X-ray machines generally have a maximum energy of several hundred Key, which can meet the requirement of penetration capability for the tire. In some embodiments, the first ray unit 111 may adopt an X-ray accelerator as well.

In an exemplary embodiment, the first ray unit 111 is a point X-ray source that radiates fan-shaped X-rays in the range of the first predetermined spread angle α.

In an exemplary embodiment, the range of the radiation energy of the ray unit is from 60 Key to 180 Key.

It should be noted that, it is within the protection scope of the present disclosure to adopt any radiation source being capable of radiation imaging for the tire of the vehicle to be inspected, and the specific radiation energy may be comprehensively selected according to factors such as vehicle types of the vehicle to be inspected, the material and thickness of the tire, etc. For example, when the vehicle to be inspected is a universal passenger car, the radiation source with the radiation energy of 80 Key may be selected; and when the vehicle to be inspected is a container car, the radiation source with radiation energy of 160 Key may be selected.

In an exemplary embodiment, the preset speed of the vehicle to be inspected 140 may be 5 km/h-20 km/h. However, the present disclosure is not limited thereto. A reminder sign may be set at a place where the vehicle to be inspected is going to enter the inspection lane, to remind the driver to decelerate to the speed range in advance.

In an exemplary embodiment, the first ray beam S1 of the first predetermined spread angle α is perpendicular to the road surface 131 of the inspection lane 130, such that the first ray beam S1 is incident perpendicularly to the first detector unit 121. The present disclosure is not limited thereto. In some embodiments, the radiation surface of the first ray beam S1 emitted by the radiation source device 110 may have a certain angle with the road surface 131 of the inspection lane 130. In other embodiments, the first ray beam S1 emitted by the radiation source device 110 may be parallel to the road surface 131 of the inspection lane 130, as long as it can ensure complete radiation imaging of the tire of the vehicle to be inspected.

In an exemplary embodiment, the imaging device 100 may further include a first sensing component (not shown). The first sensing component may be provided on the first end of the inspection lane 130 (for example the entrance end of the inspection lane 130). The first sensing component is configured to detect whether the vehicle to be inspected 140 enters the inspection lane 130. When the first sensing component detects that the vehicle to be inspected 140 is driving into the inspection lane 130, it outputs a first sensing signal and sends it to the imaging device 100, to notify the imaging device 100 that a vehicle to be inspected has entered into the inspection lane 130.

In an exemplary embodiment, the first sensing component includes a ground sensing coil embedded at the entrance of the inspection lane 130.

For example, a barrier gate, traffic lights, etc. may be provided at the entrance of the inspection lane, and the driver may judge whether the inspection lane can be entered or not by the opening of the barrier and the indication of the traffic light. When the first tire 141 of the vehicle to be inspected 140 presses on the ground sensing coil, the railing of the barrier gate is lifted, and the traffic signal turns green, then the vehicle to be inspected begins to enter into the inspection lane.

In some embodiments, the imaging device 100 may further include a license plate recognition device that simultaneously records the license plate information when the vehicle to be inspected enters the inspection lane.

In an exemplary embodiment, the imaging device 100 it further includes: a second sensing component (not shown), provided between the first sensing component and the radiation source device 110, and configured to output a second sensing signal indicating that the first tire 141 of the vehicle to be inspected 140 enters the radiation area of the radiation source device 110, so as to control the radiation source device 110 to emit the rays with a first dose.

In an exemplary embodiment, the second sensing component includes a first photoelectric switch group, and the first photoelectric switch group is provided on both sides of the inspection lane 130 and/or the road surface 131 of the inspection lane 130.

For example, when the front tire (first tire 141) of the vehicle to be inspected 140 presses on the ground sensing coil, at the same time, since the vehicle to be inspected 140 enters the inspection lane 130 and blocks the first photoelectric switch group, the radiation source device 110 starts to output the beam. The first photoelectric switch group confirms the arrival of the vehicle by adopting a light curtain or a cross-photoelectric signal and through the ground sensing signal of the ground sensing coil, then the radiation scanning starts.

In an exemplary embodiment, the imaging device 100 further includes: a third sensing component (not shown), provided on the second end of the inspection lane 130 (such as the exit end of the inspection lane 130), and configured to output a third sensing signal indicating that the first tire 141 of the vehicle to be inspected 140 has driven away from the radiation area of the radiation source device 110, so as to control the radiation source device 110 to emit the rays with a second dose.

In an exemplary embodiment, the third sensing component includes a second photoelectric switch group, and the first photoelectric switch group is provided on both sides of the inspection lane 130 and/or the road surface 131 of the inspection lane 130.

The second dose is less than the first dose. The first dose is at least capable of satisfying the requirement that the first ray beam S1 penetrates through the first tire of the vehicle to be inspected for radiation imaging. When the first tire of the vehicle to be inspected drives out of the radiation area of the radiation source device, the radiation dose of the radiation source may be reduce to reduce the dose emitted to the driver and the passenger. In some embodiments, the second dose may be zero, that is, when the third sensing component detects that the currently-scanned first tire has driven away from the radiation area, the radiation source device 110 may be controlled to be turned off, and stop outputting the beam. For example, when the first tire of the vehicle to be inspected 140 passes the second photoelectrical switch group, the radiation source device 110 stops outputting the beam.

In some embodiments, upright columns may be mounted on the two sides (left and right sides) of the inspection lane 130 respectively, and the first photoelectric switch group and/or the second photoelectric switch group may be provided on the columns. In other embodiments, the first photoelectric switch group and/or the second photoelectric switch group may be provided on the road surface of the inspection lane 130 through which the vehicle to be inspected 140 passes. In other embodiments, the height from ground of the first photoelectric switch group and the second photoelectric switch group is approximately the height from ground of the chassis of the vehicle to be inspected 140. In this way, when the signal emitted by photoelectric switch groups is blocked, it may be determined that it is the tire instead of the vehicle body of the vehicle to be inspected, and the tire of the vehicle to be inspected may be identified immediately just when it is close to the radiation source device.

In some embodiments, the distance between the radiation source device 110 and the first sensing component is equal to or slightly larger than the radius of the tire of the vehicle to be inspected 140. In other embodiments, the second sensing component is closer to the radiation source device 110 rather than the first sensing component, that is, slightly away from the first sensing component. In some embodiments, the distance between the radiation source device 110 and the third sensing component is equal to or slightly larger than the diameter of the tire of the vehicle to be inspected 140.

In an exemplary embodiments, when the first sensing component and/or the second sensing component detects the third tire of the vehicle to be inspected 140 (for example, one of the rear tires of the vehicle to be inspected, the first tire and the third tire are located on the same side of the vehicle to be inspected, for example, the right side), the imaging device 100 controls the radiation source device 110 to re-start outputting the rays or convert from the second dose to the first dose for carrying out the radiation imaging for the third tire. When the third sensing component detects that the third tire is driving away from the radiation area of the radiation source device 110, the imaging device 100 controls the radiation source device 110 to convert from the first dose to the second dose for stopping the emission or reducing the dose emitted.

The rear tire of the vehicle to be inspected 140 enters and blocks the first photoelectric switch group and at the same time the rear tire presses on the ground sensing coil, the radiation source device 110 starts to output the beam. After the rear tire of the vehicle to be inspected 140 passes through the second photoelectric switch group, the radiation source device 110 stops outputting the beam. When it detects that the last tire passes away, the rays are turned off and the detection is ended, the system controls the barrier gate to fall down to restrict the next car from entering the inspection lane, so as to give time to the operator to judge the vehicle image, and after the operator presses the enter key, the system enters a status that the next vehicle is to be checked.

The above description is made by taking two tires in front and rear of the vehicle to be inspected 140 as an example. However, in practice, the above procedure of detection, radiation, stopping outputting the beam/reducing the radiation dose, re-detection and re-radiation re-stopping outputting the beam/reducing the radiation dose, may be performed cyclically according to the number of tires in front and rear of the vehicle to be inspected, till all the tires on at least one side of the vehicle to be inspected are detected. For example, some of the vehicle to be inspected has front, middle and rear tires, then the radiation imaging process may be performed three times according to the above procedure. The present disclosure does not limit the number of tires of the vehicle to be inspected.

It should be noted that, in the above embodiments, the ground sensing coil and the photoelectric switch group are adopted to detect that the tire of the vehicle to be inspected enters or leaves the radiation area, but the present disclosure is not limited thereto. For example, any device capable of detecting, such as an infrared ray emitting device, a visible light emitting device, an electromagnetic signal transmitting device, or an ultrasonic transmitting device, or any combination thereof, may be adopted for replacement.

In an exemplary embodiment, the imaging device 100 further includes: a speed sensor, configured to measure a moving speed of the vehicle to be inspected in the inspection lane.

In some embodiments, the speed sensor includes speed measuring radars set on both sides of the inspection lane 130.

In other embodiments, system controls reconstruction of the radiation image of the tire of the vehicle to be inspected 140 according to the moving speed of the vehicle to be inspected 140 received from the speed sensor, and corrects the radiation image data according to the moving speed.

In an exemplary embodiment, the imaging device 100 further includes: a first delay device, connected to the speed sensor, and configured to set a first delay time T1 according to the moving speed and the size of the first tire. When the second sensing component detects that the first tire 141 of the vehicle to be inspected 140 enters the radiation area of the radiation source device 110, after the first delay time T1, a first control signal is output to control the dose of the rays emitted by the radiation source device 110 to be converted from the first dose to the second dose.

For example, the imaging device 100 calculates the time taken by the current vehicle to be inspected 140 to pass through the radiation area of the radiation source device 110, by detecting the real-time vehicle speed of the current vehicle to be inspected 140 entering the inspection lane 130 and the size of the scanned tire of the current vehicle to be inspected 140. The first delay time T1 is set to be greater than or equal to the calculated taken time. Timing is started from the time when it is detected that the scanned tire enters the radiation area, then it is determined whether the time reaches T1. When the T1 time is reached, the imaging device 100 determines that the scanned tire has completely passed the radiation area. At this time, the imaging device 100 controls the radiation source device 110 to reduce the amount of radiation to the second dose or stop outputting the beam, thereby reducing the scanning for useless objects and reducing the additional radiation dose to the driver and passengers.

In an exemplary embodiment, the imaging device 100 further includes: a second delay device, connected with the speed sensor, and configured to set a second delay time according to the moving speed and the wheelbase between the first tire 141 and a third part (for example, a rear tire on the same side as the first tire, hereinafter referred to as the third tire) of the vehicle to be inspected 140. When the dose of the rays emitted by the radiation source device 110 is converted from the first dose to the second dose, after the second delay time, a second control signal is output to control the dose of the rays emitted by the radiation source device 110 to be converted from the second dose to the first dose.

The wheelbase between the first tire 141 and the third tire is, for example, a linear distance between the center origins of the front and the rear tires. The time taken by the first tire 141 to leave the radiation source device 110 and the third tire to enter the radiation source device 110 is calculated according to the real-time vehicle speed of the vehicle to be inspected 140 and the wheelbase between the front and the rear tires thereof. The second delay time T2 is set to be equal to or less than the calculated taken time. The imaging device 100 controls the radiation source device 110 to re-start the outputting of the rays, thereby carrying out the radiation imaging of the rear tire, that is, the third tire.

Embodiments of the present disclosure use a low dose of rays to check the cockpit, so that the ray dose received by the cockpit is very low and the driver need not get off the vehicle. The part such as a tire is inspected by using a high dose of rays to obtain a clear image of the target part.

It should be noted that, although in the above embodiment, after the first tire is inspected and before the third tire is inspected, the dose of the emitted rays may be lowered or even the radiation source device may be turned off. However, in other embodiments, the dose of the rays demitted by the radiation source device does not change from the time when the first tire of the vehicle to be inspected is detected, until all the tires on the same side (for example, the right side) of the vehicle to be inspected are detected. That is, the radiation imaging is performed on all the specific parts between the two tires on the same side of the vehicle to be inspected. This allows simultaneous detection for prohibited items in the specific parts such as tires, tool cases, boot, etc.

In an exemplary embodiment, the imaging device 100 further includes: a data acquisition and imaging device, connected with the detector device, configured to receive a first ray intensity data output by the first ray unit 111 to generate a first radiation image of the first tire 141.

In an exemplary embodiment, the imaging device 100 further includes: an image-capturing device, configured to collect vehicle information, and the image-capturing device may be mounted above the inspection lane to capture a body image of the vehicle to be inspected 140, for the identification of a vehicle license plate, etc.

In an exemplary embodiment, the imaging device 100 further includes: a display device, connected with the data acquisition and imaging device, configured to display the first radiation image of the vehicle to be inspected 140.

In some embodiments, the imaging device 100 further includes: a storage device, configured to correlatively store the radiation image information of the tire and the license plate information of the same vehicle to be inspected, so as to facilitate the search and comparison operation in the future.

In some embodiments, the display device may simultaneously display the radiation image of the vehicle to be inspected and the other information of the vehicle to be inspected (such as the license plate number), and simultaneously transmit and save the radiation image and the vehicle information by using the correlation technology.

In an exemplary embodiment, the imaging device 1004 further includes: a judging device, configured to determine, according to the first radiation image, whether a prohibited item is entrained in the first tire 141. In some embodiments, when the judging device determines that the first tire of the vehicle to be inspected entrains a prohibited item, it can assist the red alarm lamp to simultaneously activate the alarm function.

The radiation source device emits a beam of rays that penetrates the tire of the vehicle to be inspected and is received by the detector device on the other side. Since the densities of the different objects is different, the absorption degrees of the rays are different, thus the signal strengths output by the detector device are different correspondingly. After the signals of different strengths are processed by the data acquisition and imaging device, the radiation image of the tire of the vehicle to be inspected is displayed on the computer screen in real-time. Different items have different shapes and densities, so that, on the radiation images, there is a distinct difference between the tire and device such as a mechanical device or electronic device, etc., so, by viewing the radiation image, it is possible to quickly identify whether a prohibited item is entrained in the tire of vehicle.

In some embodiments, tires of vehicle generally are empty, and there is no other thing under normal circumstances. When it is determined that there is a contour of other articles in the radiation image of the tire, generally it shall directly issue an warning message prompting that a prohibited item may be entrained in the tire of the vehicle to be inspected.

In other embodiments, since the information such as composition, structure and size of the tire of vehicle is relatively fixed and known, the range of the ray intensity data corresponding to the commonly-used tires may be pre-stored in a storage unit of the device. When the device receives the ray intensity data of the tire of the vehicle to be inspected, the detected ray intensity data is analyzed. If the probed data does not match the range of the data stored in the storage unit, that is, the prove data is not within the range of the data stored in the storage unit, it is prompted that an abnormality arises, and it is determined that a prohibited item may be entrained in the tire of the vehicle to be inspected.

In an exemplary embodiment, the imaging device 100 further includes: a control device, connected with the radiation source device 110 and the detector device 120, configured to control the activation and deactivation of the radiation source device 110 and the detector device 120. In some embodiments, the control device may be a programmable controller. The radiation source device 110, the detector device 120, the sensing component, etc. are connected to the programmable controller by wire or wirelessly.

In some embodiments, the control device is a small cabinet mounted on a side of the detector device 120 with an Ethernet interface.

In some embodiments, each module such as the radiation source device 110, the detector device 120 and the control device, etc. is separate and closed, and the connection between the modules is plug-in type, and no wiring is required. It is only necessary to change the corresponding radiation source device according to the type of vehicle, thereby switching to the imaging device of the tire of universal passenger car or the imaging device of the tire of the container vehicle. The image-capturing device, etc. shall be mounted on the detector device or the control device as much as possible to reduce the interface with the field.

In some embodiments, the imaging device 100 may further include a power supply accessory, configured to separately supply power to each module, for easy maintenance.

In some embodiments, the imaging device 100 may further include a data analysis device that performs data analysis and data mining on all data of the vehicle to be inspected.

In some embodiments, the imaging device 100 may also provide a data interface that may be integrated into the existing business management system of the customer.

The imaging device for use in vehicle security check provided by the embodiments of the present disclosure utilizes the ray radiation imaging technology, which addresses scanning inspection for the vehicle tire, provides strong pertinence, clear target and low false rate, and may inspect the tire of the vehicle quickly. The device adopts a fully automatic scanning mode. The driver may directly drive the vehicle through the inspection lane without the operation of personnel and parking. On the other hand, the inspection speed is fast. The vehicle to be inspected can pass through at a speed of 5 km/h to 20 km/h, and the inspection can be completed within a few seconds. The imaging device can be operated 24 hours per day. The imaging device is of modular structure design and occupies a small area. Further, customized solutions can be provided according to the customer's need and the site condition. The scanning system has clear objective and simple and reliable operability, and can focus on safety inspections for the positions of tires of passenger car and container vehicle.

Figure 2:
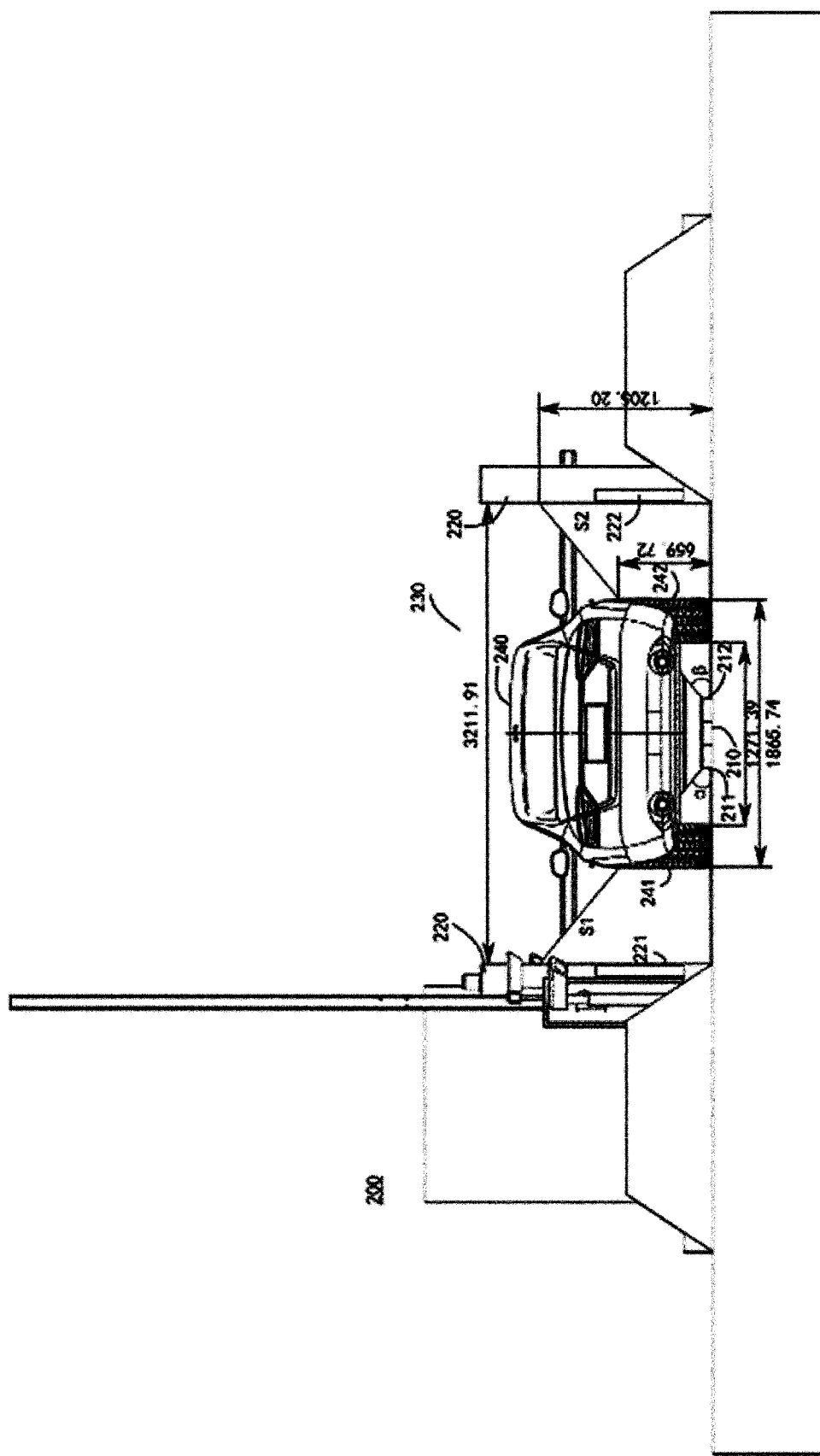
FIG. 2 is a schematic structure diagram illustrating of an imaging device for use in vehicle security check according to another exemplary embodiment of the present disclosure.

FIG. 2 is a schematic structure diagram illustrating of an imaging device for use in vehicle security check according to another exemplary embodiment of the present disclosure.

As shown in FIG. 2, an imaging device 200 for use in vehicle security check includes a radiation source device 210 and detector device 220.

In an exemplary embodiment, the radiation source device 210 includes a first ray unit 211 and a second ray unit 212. The first ray unit 211 emits a first ray beam S1 by a first predetermined spread angle α, thus allowing the first ray beam S1 to penetrate the first tire 241 of the vehicle to be inspected 240 passing through the inspection lane 230 at a preset speed. The second ray unit 212 emits a second ray beam S2 by a first predetermined spread angle β, thus allowing the second ray beam S2 to penetrate the second part (for example, a second tire 242) of the vehicle to be inspected.

The first predetermined spread angle α is related to the diameter of the first tire 241, the distance between the first tire 241 and the first ray unit 211, which satisfies or approximately satisfies that the first ray beam S1 can completely pass through the vertical cross section of the first tire 241. Similarly, the second predetermined spread angle β is related to the diameter of the second tire 242, the distance between the second tire 242 and the second ray unit 212, which satisfies or approximately satisfies that the second ray beam S2 can completely pass through the vertical cross section of the second tire 242.

In an exemplary embodiment, each of the first ray unit 211 and the second ray unit 212 adopts an X-ray machine. The X-ray machine of corresponding type may be selected according to the type of the vehicle to be inspected. For example, when the vehicle to be inspected is a universal passenger car, VJ-IXS0808 (80 KV, 80 W) can be used; and when the vehicle to be inspected is a container car, VJ-IXS1820 (160 KV, 200 W) can be used. In some embodiments, the two X-ray machines are provided in a back-to-back manner.

In an exemplary embodiment, the first ray unit 211 includes a ray source and a shield, and the shield is configured to shield ray beam outside the first ray beam S1 and the second ray beam S2. The ray source may be provided in the shield as a radiation source, and the shield may be provided with a ray collimator. The shield may be made of a material of lead plate.

In the embodiment shown in FIG. 2, the direction of the first predetermined spread angle α is opposite to the direction of the second predetermined spread angle β. For example, the first predetermined spread angle α is toward the right side of the vehicle to be inspected, and the second predetermined spread angle β is toward the left side of the vehicle to be inspected. The present disclosure is not limited thereto.

In an exemplary embodiment, the radiation source device 210 is at least partially disposed on the road surface 231 of the inspection lane 230, such that the target center of the radiation source is exposed out of the road surface 231. The radiation source device 210 is located at the center of the road surface 231 of the inspection lane 230.

In some embodiments, the angle of the first predetermined spread angle is equal to the angle of the second predetermined spread angle, that is, α=β. The present disclosure is not limited thereto.

The detector device 220 includes a first detector unit 221 disposed corresponding to the first ray unit 211 and a second detector unit 222 disposed corresponding to the second ray unit 212. The first detector unit 221 is configured to receive the first ray beam S1 penetrating through the first tire 241, and the second detector unit 222 is configured to receive the second ray beam S2 penetrating through the second tire 242.

In an exemplary embodiment, the first detector unit 221 is provided on the first side of the inspection lane 230 (for example, the right side), and the second detector unit 222 is provided on the second side 233 of the inspection lane 230 (for example, the left side). In FIG. 2, the first detector unit 221 and the second detector unit 222 are oppositely arranged. However the present disclosure is not limited thereto, as long as it is capable of receiving the beams of the rays passing through the tires on the left and the right sides of the vehicle to be inspected respectively.

In an exemplary embodiment, the first detector unit 221 and the second detector unit 222 are provided with a predetermined height. The predetermined height is determined according to the first predetermined spread angle α of the first ray beam S1, the second predetermined spread angle β of the second ray beam S2 and the size of the first tire 241 and the second tire 242, which is configured to ensure that both the left and the right tires of the vehicle to be inspected 240 can be completely radiated.

For exemplary, for a universal passenger vehicle, supposing that the distance between the inner surfaces of the first tire 241 and the second tire 242 is 1271.39 mm, the distance between the outer surfaces of the first tire 241 and the second tire 242 is 1865.74 mm, the diameters of both the first tire 241 and the second tire 242 of the vehicle to be inspected 240 are 659.72 mm, the distance between the left and the right sides of the inspected lane 230 is 3211.97 mm, and the first tire 241 and the second tire 242 are symmetric with respect to the radiation source device 210, the first predetermined spread angle α and the second predetermined spread angle β may be provided by 40 degrees, and the start-inspection height of the first detector unit 221 and the second detector unit 222 is provided by about 1205.20 mm. The above data is given based on the ideal situation, and there may be some tolerance in the accrual application site. The above data is given according to the specification of the universal passenger car, and the corresponding data range may be selected according to different specifications of vehicles.

In an exemplary embodiment, the detector unit 221 and the second detector unit 222 are line array detectors. It detects a one-dimensional X-ray intensity distribution by the aid of light-receiving elements arranged in the longitudinal direction of the two line sensors.

In an exemplary embodiment, a plurality of the first detector unit 221 and the second detector unit 222 are respectively arranged at different heights, which are configured to detect the upper, middle and lower parts of the tire of the vehicle to be inspected 240.

In an exemplary embodiment, each of the first detector unit 221 and the second detector unit 222 adopts a single-row, double-row or multiple-row of scintillator structures. The scintillator may be at least one of cadmium tungstate scintillation crystal, thallium doped cesium iodide scintillation crystal or bismuth germanate scintillation crystal. In some embodiments, the first detector unit 221 and first detector unit 222 further include photomultiplier tubes coupled to the scintillator. Other types of detectors are within the protected scope of the present disclosure as well.

In an exemplary embodiment, both the radiation surfaces of the first ray beam S1 of the first predetermined spread angle α and the second ray beam S2 of the second predetermined spread angle β are perpendicular to the road surface 231 of the inspection lane 230.

In an exemplary embodiment, when the first sensing component and the second sensing component detect that the front axle left tire and right tire (that is, the first tire 241 and the second tire 242) of the vehicle to be inspected 240 approach the radiation source device 210, the control device sends out a control signal to control the radiation source device 210 to emit the rays with the first dose. The first detector unit 221 and the second detector unit 222 receive the first ray beam S1 and the second ray beam S2 of the two side respectively. The first radiation image of the left tire on the front axle and the second radiation image of the right tire on the front axle are generated according to the received first ray beam S1 and the second ray beam S2 respectively. When the third sensing component detects that the left tire and the right tire on the front axle of the vehicle to be inspected 240 have completely passed through the radiation source 210, the control device sends out a control signal to control the radiation source 210 to emit the rays with the second dose or stop outputting the beam. Similarly, when the first sensing component and the second component detect that the left tire and the right tire (that is, the third tire and the fourth tire) on the rear axle of the vehicle to be inspected 240 approach the radiation source 210, the control device again sends out a control signal to control the radiation source 210 to emit the rays with the first dose. The first detector unit 221 and the second detector unit 222 receive the first ray beam S1 and the second ray beam S2 of the two side respectively. The third radiation image of the left tire on the rear axle and the fourth radiation image of the right tire on the rear axle are generated according to received first ray beam S1 and second ray beam S2 respectively. When the third sensing component detects that the left tire and the right tire on the rear axle of the vehicle to be inspected 240 have completely passed through the radiation source 210, the control device sends out a control signal to control the radiation source 210 to emit the rays with the second dose or stop outputting the beam, till all the tires of the vehicle to be inspected 240 are detected.

In other embodiments, the first delay device and the second delay device similar to that in the above-described embodiments may be adopted to control the opening and the closing of the radiation source device 210 and the detector device 220 as well. In this way, the tires on the front axle and the rear axle of the vehicle to be inspected are time-divisionally radiated and imaged. The above embodiments may be referred to for specific content which will not be described herein again.

It should be noted that the items of "first", "second", "third", "fourth", etc. in the embodiments of the present disclosure are not used for limiting the number or for limiting the order. For example, the first tire 241 does not only include one tire, and may include two tires or even a plurality of tires; and the first tire 241 may be any tire in the vehicle to be inspected 240.

The radiation source device emits the fan-shaped first ray beam and second ray beam from the underside of the vehicle to be inspected to the both sides thereof, which are received, after penetrating the first tire/the third tire and the second tire/the fourth tire on both sides, by the first detector unit and the second detector unit mounted on both sides of the inspection lane. Since the densities of different parts of item are different, the absorption degrees of the rays are different, and the signal intensities output by the detector units are different correspondingly. After the signals of different intensities are performed by image processing, the outline and shape of the item inside the tire are displayed on the computer screen, thereby determining whether the prohibited item is entrained in the respective tires of the vehicle to be inspected or not.

The imaging device for use in vehicle security check provided by the embodiments of the present disclosure arranges two detector units symmetrically on the left and the right sides of the inspection lane. Each side only radiates and images the tire of one side, so that it is possible to make the radiation images of the left and the right tires not overlap. On the other hand, by arranging the radiation source device to be at the intermediate position of the road surface of the inspection lane, the left and right tires are approximately symmetrical with respect to the radiation source device, so that the magnification of the radiation images of the left and the right tires are close to or the same. At the same time, when the left and right tires enter the radiation area, the radiation source device is turned on, and when the left and the right tires are driven away from the radiation area, the beam outputting is stopped or the emitted dose is reduced, so that only the tire area is imaged without imaging other parts, thus the dose of exposure amount received by the occupants is minimized, to ensure the safety of the system.

For other content of the embodiment, the content in the above embodiments of FIG. 1 may be referred to, and details are not described herein again.

Figure 3:
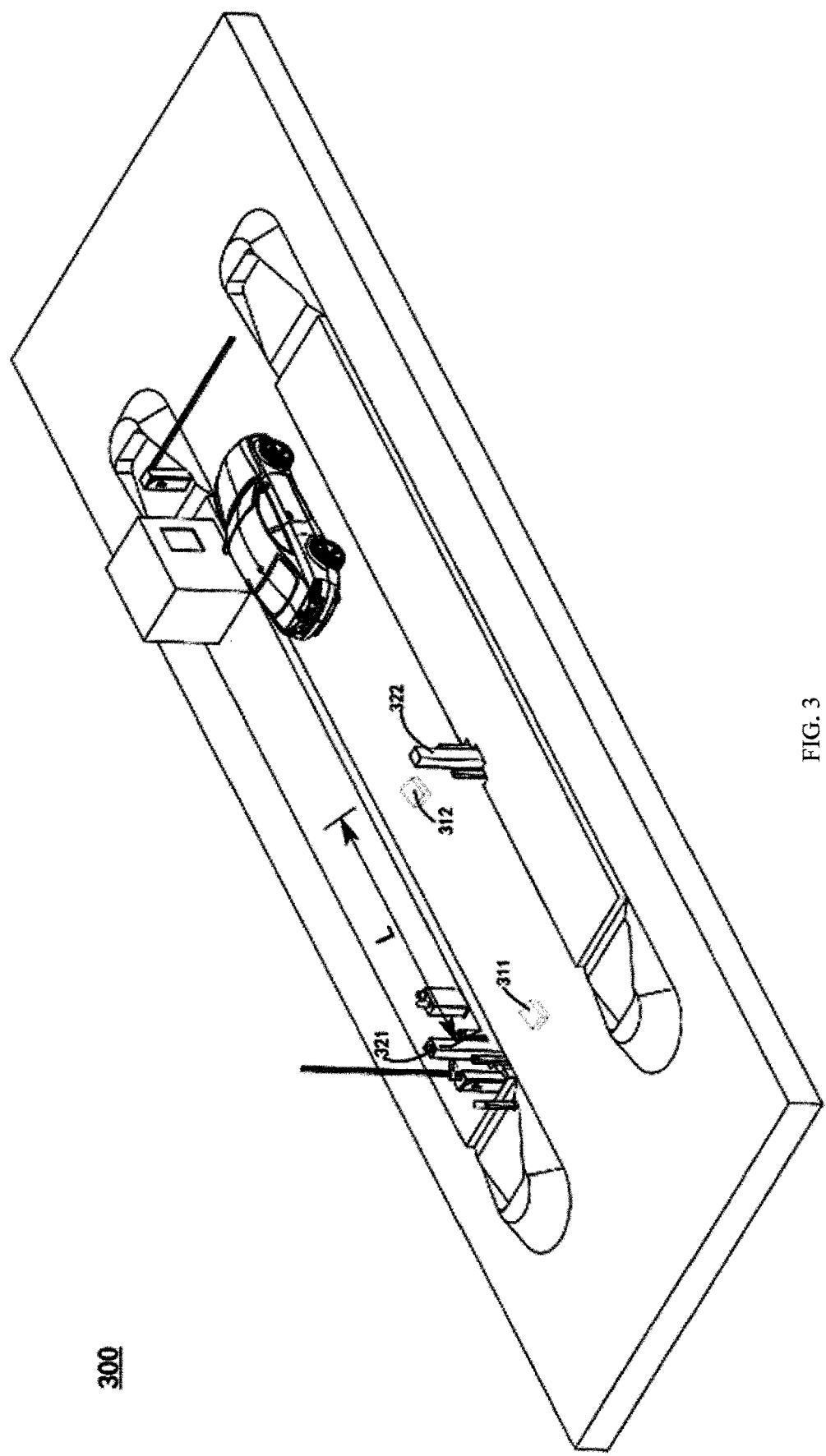
FIG. 3 is a structure diagram illustrating of an imaging device for use in vehicle security check according to a further exemplary embodiment of the present disclosure.

FIG. 3 is a structure diagram illustrating of an imaging device for use in vehicle security check according to a further exemplary embodiment of the present disclosure.

As shown in FIG. 3, an imaging device 300 for use in vehicle security check includes a radiation source device and detector device.

The radiation source device may include a first ray unit 311 and a second ray unit 312. The first ray unit 311 emits a first ray beam by a first predetermined spread angle α, thus allowing the first ray beam to penetrate the first tire of the vehicle to be inspected passing through the inspection lane at a preset speed. The second ray unit 312 emits a second ray beam by a second predetermined spread angle, thus allowing the second ray beam to penetrate the second tire of the vehicle to be inspected.

The detector device includes a first detector unit 321 disposed corresponding to the first ray unit 311 and a second detector unit 322 disposed corresponding to the second ray unit 312. The first detector unit 321 is configured to receive the first ray beam penetrating through the first tire, and the second detector unit 322 is configured to receive the second ray beam penetrating through the second tire.

The radiation source device is at least partially provided on the road surface of the inspection lane, the first detector unit 321 is provided on the first side of the inspection lane, and the second detector unit 322 is provided on the second side of the inspection channel. It differs from the embodiment shown in FIG. 2 in that the first ray unit and the second ray unit of FIG. 2 are arranged next to each other in a back-to-back manner, and the first detector unit and the second detector unit are oppositely arranged, while in the embodiment of FIG. 3, the first ray unit and the second ray unit are separated by a predetermined distance L along the length direction of the inspection lane, and correspondingly, the first detector unit and the second detector unit are arranged apart by the predetermined distance L along the length direction of the inspection lane as well.

Correspondingly, the first end of the first ray unit 311 is provided with its corresponding first sensing component and second sensing component for outputting a sensing signal indicating that the first tire or the third tire of the vehicle to be inspected (for example, front and rear tires of the right side) enter the inspection lane, for which the imaging device 300 controls the first ray unit 311 and the first detector unit 321 to start the radiation imaging operation for the first tire or the third tire. The second end of the first ray unit 311 is provided with its corresponding third sensing component for outputting a sensing signal indicating that the first tire or the third tire of the vehicle to be inspected is driving away from the inspection lane, for which the imaging device 300 controls the first ray unit 311 and the first detector unit 321 to stop the radiation imaging operation of the first tire or the third tire. Similarly, the first end of the first ray unit 312 is provided with its corresponding first sensing component and second sensing component for outputting a sensing signal indicating that the second tire or the fourth tire of the vehicle to be inspected (for example, front and rear tires of the left side) enter the inspection lane, for which the system controls the second ray unit 312 and the second detector unit 322 to start the radiation imaging operation of the second tire or the fourth tire. The second end of the second ray unit 312 is provided with its corresponding third sensing component for outputting a sensing signal indicating that the second tire or the fourth tire of the vehicle to be inspected is driving away from the inspection lane, for which the system controls the second ray unit 312 and the second detector unit 322 to stop the radiation imaging operation of the second tire or the fourth tire.

In an exemplary embodiment, both the first ray unit 311 and the second ray unit 312 are provided at an intermediate position of the road surface of the inspection lane. However, the present disclosure is not limited thereto, and the first ray unit 311 and the second ray unit 312 may be provided on the road surface of the inspection lane, which is close to a side.

The imaging device for use in vehicle security check provided by the embodiment arranges the first ray unit and the second ray unit to be spaced by a certain distance, for example, it scans the right front tire of the vehicle to be inspected for radiation imaging, and after a certain period of time, it scans the left front tire of the vehicle to be inspected through the second radiation unit, thereby further reducing the radiation amount to the driver and passenger.

For other content of the embodiments, the foregoing embodiment can be referred to, and details are not described herein again.

It should be understood that the structures schematically shown in FIGS. 1-3 are merely examples of the image device for use in vehicle security check according to the present disclosure, and the present disclosure is not limited thereto. For example, it is possible to simultaneously set two (or more) detector units and their corresponding two ray units on the same side of the inspection lane (for example, the right side or the left side), which may be used for simultaneously radiation imaging of the front and rear tires of the vehicle to be inspected respectively.

Figure 4:
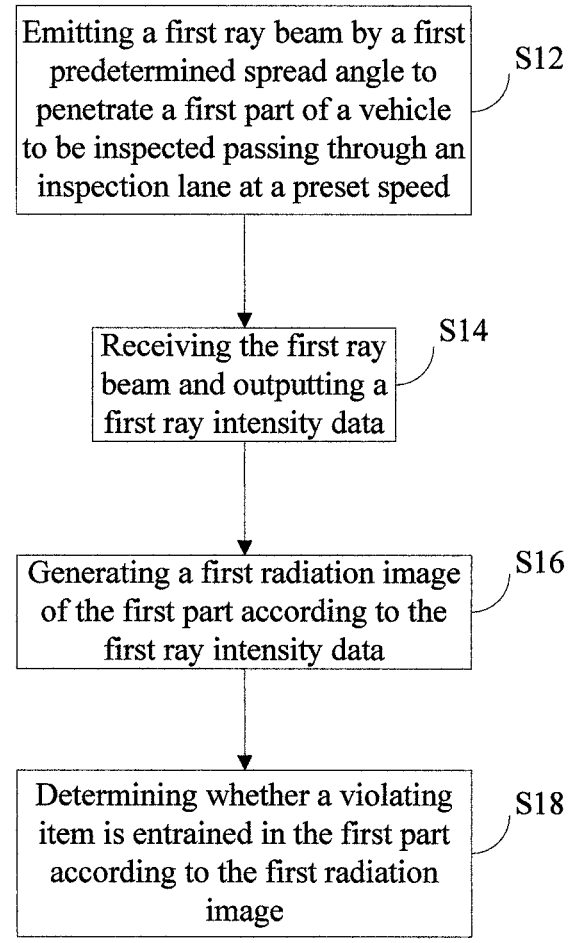
FIG. 4 is a flow chart illustrating of an imaging method for use in vehicle security check according to an exemplary embodiment of the present disclosure.

FIG. 4 is a flow chart illustrating of an imaging method for use in vehicle security check according to an exemplary embodiment of the present disclosure.

As shown in FIG. 4, in step S12, emitting a first ray beam by a first predetermined spread angle to penetrate a first part of a vehicle to be inspected passing through an inspection lane at a preset speed.

For example, the first part may be a first tire of the vehicle to be inspected, and the first tire may be any front or rear tire on the right or left side of the vehicle to be inspected.

In step S14, receiving the first ray beam to output a first ray intensity data.

In step S16, generating a first radiation image of the first part according to the first ray intensity data.

In step S18, determining whether a violating item is entrained in the first part according to the first radiation image.

In an exemplary embodiment, the imaging method further includes: when it is detected that the first part of the vehicle to be inspected passes a radiation area in the inspection lane, after a predetermined delay time, scanning a third part of the vehicle to be inspected by the first ray beam to checking whether a prohibited item is entrained in the third part.

For example, the third part may be a third tire of the vehicle to be inspected, and the third tire may be a rear tire on the same side as that of the first tire.

For other content of the embodiment, the foregoing embodiment can be referred to, and details are not described herein again.

Figure 5:
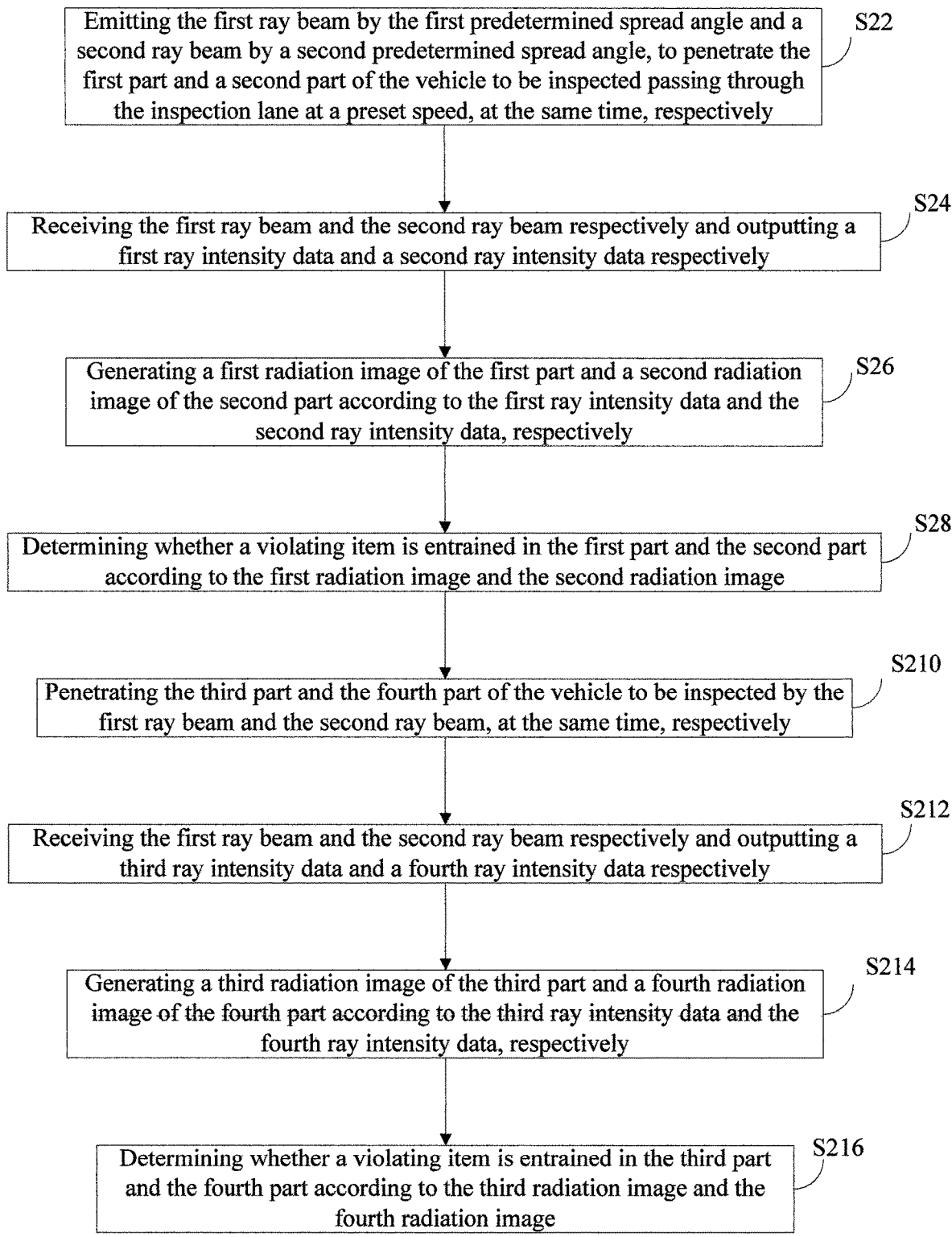
FIG. 5 is a flow chart illustrating of an imaging method for use in vehicle security check according to another exemplary embodiment of the present disclosure.

FIG. 5 is a flow chart illustrating of an imaging method for use in vehicle security check according to another exemplary embodiment of the present disclosure.

As shown FIG. 5, in step S22, emitting the first ray beam by the first predetermined spread angle and a second ray beam by a second predetermined spread angle, to penetrate the first part and a second part of the vehicle to be inspected passing through the inspection lane at a preset speed, at the same time, respectively.

For example, the first part and the second part may be the first tire and the second tire of the vehicle to be inspected respectively, and the first tire and the second tire may be the two left and right tires on the front axle of the vehicle to be inspected.

In step S24, receiving the first ray beam and the second ray beam respectively to output a first ray intensity data and a second ray intensity data respectively.

In step S26, generating a first radiation image of the first part and a second radiation image of the second part according to the first ray intensity data and the second ray intensity data, respectively.

In step S28, determining whether a violating item is entrained in the first part and the second part according to the first radiation image and the second radiation image.

In step S210, penetrating the third part and the fourth part of the vehicle to be inspected by the first ray beam and the second ray beam, at the same time, respectively.

For example, the third part and the fourth part may be the third tire and a fourth tire of the vehicle to be inspected, respectively, and the third tire and the fourth tire may be the two left and right tires on the rear axle of the vehicle to be inspected.

In step S212, receiving the first ray beam and the second ray beam respectively to output a third ray intensity data and a fourth ray intensity data respectively.

In step S214, generating a third radiation image of the third part and a fourth radiation image of the fourth part according to the third ray intensity data and the fourth ray intensity data, respectively.

In step S216, determining whether a violating item is entrained in the third part and the fourth part according to the third radiation image and the fourth radiation image.

The above steps S28 and S216 may be combined into one step, that is, after the radiation images of all of the tires of vehicle to be inspected are obtained, determining whether a prohibited item is entrained in the respective parts.

For other content of the embodiments, the foregoing embodiment can be referred to, and details are not described herein again.

Figure 6:
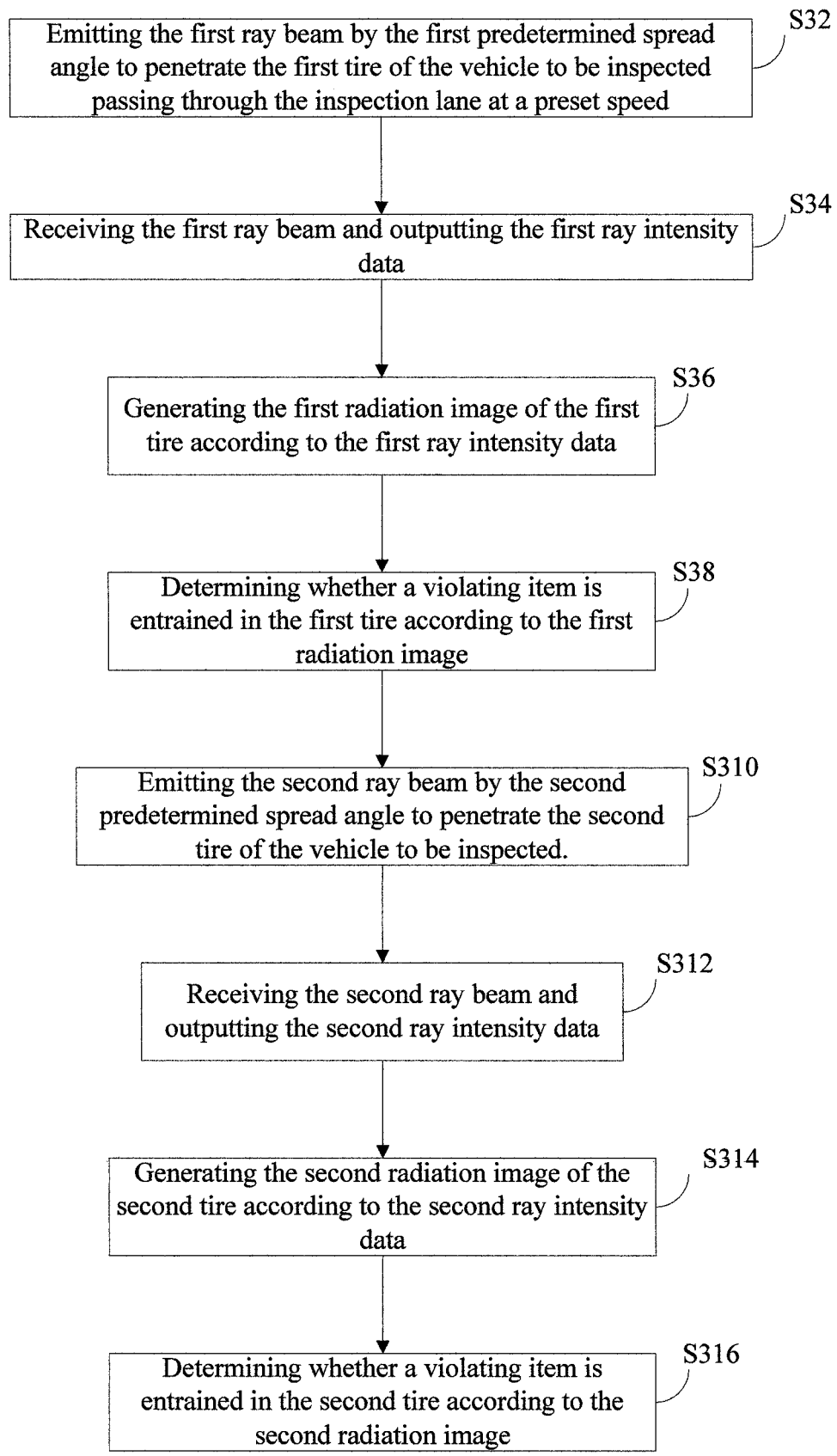
FIG. 6 is a flow chart illustrating of an imaging method for use in vehicle security check according to a further exemplary embodiment of the present disclosure.

FIG. 6 is a flow chart illustrating of an imaging method for use in vehicle security check according to a further exemplary embodiment of the present disclosure.

As shown FIG. 6, in step S32, emitting the first ray beam by the first predetermined spread angle to penetrate the first tire of the vehicle to be inspected passing through the inspection lane at a preset speed.

In step S34, receiving the first ray beam to output the first ray intensity data.

In step S36, generating the first radiation image of the first tire according to the first ray intensity data.

In step S38, determining whether a violating item is entrained in the first tire according to the first radiation image.

In step S310, emitting the second ray beam by the second predetermined spread angle to penetrate the second tire of the vehicle to be inspected.

In step S312, receiving the second ray beam to output the second ray intensity data.

In step S314, generating the second radiation image of the second tire according to the second ray intensity data.

In step S316, determining whether a violating item is entrained in the second tire according to the second radiation image.

From the above detailed description, those skilled in the art will readily appreciate that the devices and method in accordance with embodiments of the present disclosure have one or more of the following advantages.

Through the imaging device for use in vehicle security check of the present disclosure and the method thereof, it is possible to quickly check whether a prohibited item is entrained in a tire of a running vehicle or not, by radiation imaging. Different radiation source modules can be set for different vehicle types, and it can focus on tires of passenger cars and container vehicle security to be checked.

The above have specifically shown and described the exemplary embodiments of the present disclosure. It should be understood that, the present disclosure is not limited to the disclosed embodiments. On the contrary, the present disclosure intends to cover various modifications and equivalent arrangements included in the spirit and scope of the appended claims.

What is claimed is:

1. An imaging device for use in vehicle security check, comprising:
   a radiation source device, comprising a first ray unit configured to emit a first ray beam by a first predetermined spread angle, to allow the first ray beam to penetrate a first part of a vehicle to be inspected passing through an inspection lane at a preset speed; and
   a detector device, comprising a first detector unit arranged corresponding to the first ray unit, wherein the first detector unit is configured to receive the first ray beam,
   wherein the radiation source device is at least partially arranged on a road surface of the inspection lane, and the first detector unit is arranged at a first side of the inspection lane,
   wherein the radiation source device is provided at a center of the road surface of the inspection lane, a target center of the first ray unit is provided above the road surface of the inspection lane, and the radiation source device emits the first ray beam from underside of the vehicle to be inspected to the first side of the inspection lane.

2. The imaging device for use in vehicle security check according to claim 1, wherein the radiation source device further comprises: a second ray unit configured to emitting a second ray beam by a second predetermined spread angle, to allow the second ray beam to penetrate a second part of the vehicle to be inspected, and
   wherein a direction of the second predetermined spread angle is different from a direction of the first predetermined spread angle.

3. The imaging device for use in vehicle security check according to claim 2, wherein the detector device further comprises: a second detector unit arranged corresponding to the second ray unit, wherein the second detector unit is configured to receive the second ray beam, and
   wherein the second detector unit is arranged at a second side of the inspection lane.

4. The imaging device for use in vehicle security check according to claim 3, wherein the first detector unit and the second detector device are provided with a predetermined height, and
   wherein the predetermined height is determined according to the first predetermined spread angle of the first ray beam and the second predetermined spread angle of the second ray beam and sizes of the first part and the second part.

5. The imaging device for use in vehicle security check according to claim 3, wherein a direction of the first predetermined spread angle is opposite to a direction of the second predetermined spread angle, and the first detector unit and the second detector unit are oppositely arranged.

6. The imaging device for use in vehicle security check according to claim 1, wherein the first ray unit comprises:
   a ray source;
   a shield; and
   a collimator,
   wherein the shield and the collimator are configured to shield rays outside the first predetermined spread angle emitted by the ray source, and constrain a width of the rays at the same time.

7. The imaging device for use in vehicle security check according to claim 1, wherein a part of the radiation source device is embedded blow the road surface of the inspection lane, and the other part is exposed out of the road surface of the inspection lane, wherein a height of the exposed part is less than a preset value, and
   wherein the preset value is related to a height from ground of a chassis of the vehicle to be inspected.

8. The imaging device for use in vehicle security check according to claim 7, wherein, when the vehicle to be inspected is of a first vehicle type, the exposed part of the radiation source device is provided with a first height, and the radiation source device emits the rays with a first energy,
   when the vehicle to be inspected is of a second vehicle type, the exposed part of the radiation source device is provided with a second height, and the radiation source device emits the rays with a second energy, and
   wherein the first height is less than the second height, and the first energy is less than the second energy.

9. The imaging device for use in vehicle security check according to claim 1, further comprising:
   a first sensing component, provided on a first end of the radiation source device, and configured to output a first sensing signal indicating that the vehicle to be inspected enters the inspection lane.

10. The imaging device for use in vehicle security check according to claim 9, further comprising:
    a second sensing component, provided between the first sensing component and the radiation source device, and configured to output a second sensing signal indicating that the first part of the vehicle to be inspected enters a radiation area of the radiation source device, so as to control the radiation source device to emit the rays with a first dose.

11. The imaging device for use in vehicle security check according to claim 10, further comprising:
a third sensing component, provided on a second end of the radiation source device, and configured to output a third sensing signal indicating that the first part of the vehicle to be inspected has driven away from the radiation area of the radiation source device, so as to control the radiation source device to emit the rays with a second dose,
wherein the second dose is less than the first dose.

12. The imaging device for use in vehicle security check according to claim 11, further comprising:
a speed sensor, configured to measure a moving speed of the vehicle to be inspected in the inspection lane.

13. The imaging device for use in vehicle security check according to claim 12, further comprising:
a first delay device, connected to the speed sensor, and configured to set a first delay time according to the moving speed and a size of the first part,
wherein, when the second sensing component detects that the first part of the vehicle to be inspected enters the radiation area of the radiation source device, after the first delay time, a first control signal is output to control a dose of the rays emitted by the radiation source device to be converted from the first dose to the second dose.

14. The imaging device for use in vehicle security check according to claim 13, further comprising:
a second delay device, connected with the speed sensor, and configured to set a second delay time according to the moving speed and a wheelbase between the first part and a third part of the vehicle to be inspected,
wherein, when the dose of the rays emitted by the radiation source device is converted from the first dose to the second dose, after the second delay time, a second control signal is output to control the dose of the rays emitted by the radiation source device to be converted from the second dose to the first dose.

15. The imaging device for use in vehicle security check according to claim 1, further comprising:
a data acquisition and imaging device, connected with the detector device, and configured to receive a first ray intensity data output by the first ray unit to generate a first radiation image of the first part; and
a judging device, configured to determine whether a prohibited item is entrained in the first part according to the first radiation image.

16. An imaging method for use in vehicle security check, applied to an imaging device for use in vehicle security check comprising: a radiation source device, comprising a first ray unit configured to emit a first ray beam by a first predetermined spread angle, to allow the first ray beam to penetrate a first part of a vehicle to be inspected passing through an inspection lane at a preset speed; and a detector device, comprising a first detector unit arranged corresponding to the first ray unit, wherein the first detector unit is configured to receive the first ray beam, wherein the radiation source device is at least partially arranged on a road surface of the inspection lane, and the first detector unit is arranged at a first side of the inspection lane, wherein the radiation source device is provided at a center of the road surface of the inspection lane, a target center of the first ray unit is provided above the road surface of the inspection lane, and the radiation source device emits the first ray beam from underside of the vehicle to be inspected to the first side of the inspection lane, and wherein method comprises:
emitting the first ray beam by the first predetermined spread angle, to penetrate the first part of the vehicle to be inspected passing through the inspection lane at the preset speed;
receiving the first ray beam to output a first ray intensity data;
generating a first radiation image of the first part according to the first ray intensity data; and
determining whether a violating item is entrained in the first part according to the first radiation image.

17. The imaging method for use in vehicle security check according to claim 16, further comprising:
emitting a second ray beam by a second predetermined spread angle, to penetrate a second part of the vehicle to be inspected;
receiving the second ray beam to output a second ray intensity data;
generating a second radiation image of the second part according to the second ray intensity data; and
determining whether a prohibited item is entrained in the second part according to the second radiation image,
wherein the direction of the second predetermined spread angle is different from the direction of the first predetermined spread angle.

18. The imaging method for use in vehicle security check according to claim 16, further comprising:
scanning a third part of the vehicle to be inspected by the first ray beam to check whether a prohibited item is entrained in the third part when it is detected that the first part of the vehicle to be inspected passes a radiation area in the inspection lane, after a predetermined delay time.

* * * * *